United States Patent
Dannoux et al.

(10) Patent No.: US 9,902,640 B2
(45) Date of Patent: Feb. 27, 2018

(54) PROCESS AND SYSTEM TUNING PRECISION GLASS SHEET BENDING

(71) Applicant: CORNING INCORPORATED, Corning, NY (US)

(72) Inventors: Thierry Luc Alain Dannoux, Avon (FR); Stephane Poissy, Brunoy (FR)

(73) Assignee: CORNING INCORPORATED, Corning, NY (US)

( * ) Notice: Subject to any disclaimer, the term of this patent is extended or adjusted under 35 U.S.C. 154(b) by 462 days.

(21) Appl. No.: 14/409,899

(22) PCT Filed: Jun. 12, 2013

(86) PCT No.: PCT/US2013/045325
§ 371 (c)(1),
(2) Date: Dec. 19, 2014

(87) PCT Pub. No.: WO2014/004085
PCT Pub. Date: Jan. 3, 2014

(65) Prior Publication Data
US 2015/0321940 A1    Nov. 12, 2015

(30) Foreign Application Priority Data
Jun. 28, 2012   (EP) .................................... 12290212

(51) Int. Cl.
*C03B 23/023*   (2006.01)
*C03B 35/20*    (2006.01)
*C03B 23/025*   (2006.01)

(52) U.S. Cl.
CPC ........ *C03B 23/023* (2013.01); *C03B 23/0235* (2013.01); *C03B 23/0256* (2013.01);
(Continued)

(58) Field of Classification Search
CPC .............. C03B 23/023; C03B 23/0235; C03B 23/0256; C03B 23/0258; C03B 2225/00; C03B 2225/02; C03B 35/20
(Continued)

(56) References Cited

U.S. PATENT DOCUMENTS

| | | |
|---|---|---|
| 1,017,833 A | 2/1912 | White |
| 4,418,370 A | 11/1983 | Harrison |

(Continued)

FOREIGN PATENT DOCUMENTS

| | | | | |
|---|---|---|---|---|
| CN | 101783397 A | 7/2010 | ............. | H01L 51/56 |
| DE | 60132320 T2 | 5/2008 | ............... | G02B 7/02 |

(Continued)

OTHER PUBLICATIONS

Chinese Office Action App No. 201380033293.7 dated Jun. 24, 2016, 10 Pgs.

(Continued)

*Primary Examiner* — Alison L Hindenlang
*Assistant Examiner* — Mohamed K Ahmed Ali
(74) *Attorney, Agent, or Firm* — F. Brock Riggs

(57) ABSTRACT

Methods and apparatus provide for modification of a work-piece at elevated temperatures. A carrier may be provided and operable to support the work-piece. A support mechanism may be provided that is movable via gross translation between a retracted position such that a distal end thereof is away from the carrier, and an extended position such that the distal end thereof is at least proximate to the carrier. A work-piece modification system may be coupled to, and disposed proximate to, the distal end of the support mechanism, and operating to facilitate modifying the work-piece at an elevated temperature. A precision tuning mechanism may couple the work-piece modification system to the support mechanism, and may operate to provide fine adjustments to (Continued)

an orientation, and a distance, of the work-piece modification system relative to the work-piece.

15 Claims, 10 Drawing Sheets

(52) U.S. Cl.
CPC .......... *C03B 23/0258* (2013.01); *C03B 35/20* (2013.01); *C03B 2225/02* (2013.01)

(58) Field of Classification Search
USPC .......................................... 65/106, 107, 273
See application file for complete search history.

(56) References Cited

U.S. PATENT DOCUMENTS

| | | | |
|---|---|---|---|
| 4,891,055 A | 1/1990 | Shibaoka et al. | |
| 5,095,320 A | 3/1992 | Rose | 346/108 |
| 5,876,477 A | 3/1999 | Bennett et al. | |
| 6,022,005 A | 2/2000 | Gran et al. | 267/136 |
| 6,029,959 A | 2/2000 | Gran et al. | 267/136 |
| 6,555,636 B1 | 4/2003 | Gibson et al. | |
| 6,556,364 B2 | 4/2003 | Meehan et al. | 359/822 |
| 6,755,131 B2 | 6/2004 | Dannoux et al. | 101/485 |
| 6,842,994 B2 | 1/2005 | McInroy | 33/613 |
| 6,870,301 B2 | 3/2005 | Choi et al. | 310/311 |
| 6,873,087 B1 | 3/2005 | Choi et al. | 310/323.17 |
| 7,117,724 B1 | 10/2006 | Goodberlet et al. | 73/105 |
| 7,515,362 B1 | 4/2009 | Gutierrez et al. | 359/813 |
| 7,716,949 B2 | 5/2010 | Bennett et al. | |
| 7,885,021 B2 | 2/2011 | Van Duren et al. | 359/822 |
| 8,986,072 B2 | 3/2015 | Darcangelo et al. | |
| 2001/0033437 A1 | 10/2001 | Meehan et al. | 359/819 |
| 2002/0020192 A1 | 2/2002 | Bader et al. | |
| 2002/0116951 A1 | 8/2002 | Dunifon et al. | |
| 2002/0150398 A1 | 10/2002 | Choi et al. | 396/428 |
| 2004/0093753 A1 | 5/2004 | McInroy | 33/613 |
| 2004/0104641 A1 | 6/2004 | Choi et al. | 310/328 |
| 2004/0149687 A1 | 8/2004 | Choi et al. | 216/40 |
| 2006/0001886 A1 | 1/2006 | Zacharie et al. | 356/486 |
| 2008/0094758 A1 | 4/2008 | Liao et al. | 360/294.4 |
| 2009/0040638 A1 | 2/2009 | Van Deuren et al. | 359/877 |
| 2010/0218555 A1 | 9/2010 | Tomioka et al. | |
| 2010/0275717 A1 | 11/2010 | Poyet et al. | 74/479.01 |
| 2011/0032060 A1 | 2/2011 | Varanish | 335/229 |
| 2012/0094084 A1 | 4/2012 | Fisher et al. | |
| 2012/0328843 A1 | 12/2012 | Cleary et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson et al. | |
| 2013/0127202 A1 | 5/2013 | Hart | |
| 2013/0295357 A1 | 11/2013 | Cleary et al. | |
| 2013/0319046 A1 | 12/2013 | Cleary et al. | |
| 2013/0323415 A1 | 12/2013 | Brackley et al. | |
| 2014/0033770 A1* | 2/2014 | Dannoux | C03B 35/202 65/158 |
| 2014/0087159 A1 | 3/2014 | Cleary et al. | |
| 2014/0087193 A1 | 3/2014 | Cites et al. | |
| 2014/0141217 A1 | 5/2014 | Gulati et al. | |
| 2014/0239034 A1 | 8/2014 | Cleary et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Frdholm et al. | |

FOREIGN PATENT DOCUMENTS

| | | | | |
|---|---|---|---|---|
| EP | 714927 | B1 | 5/2007 | .............. G02B 7/02 |
| EP | 1277071 | | 1/2008 | .............. G02B 7/02 |
| EP | 1277071 | B1 | 9/2008 | .............. G02B 7/02 |
| EP | 1240550 | | 5/2013 | .............. G03F 1/00 |
| JP | 63021229 | A * | 1/1988 | ......... C03B 23/0256 |
| JP | 63021229 | A | 1/1988 | ........... C03B 23/025 |
| KR | 2003094887 | A | 12/2003 | ............. B23Q 15/00 |
| KR | 2009082695 | A | 7/2009 | |
| KR | 947857 | B1 | 3/2010 | .............. B23Q 5/28 |
| KR | 10-1022033 | | 3/2011 | |
| WO | WO2001033300 | A2 | 5/2001 | |
| WO | WO2001033300 | A3 | 5/2001 | |
| WO | WO2001081970 | A2 | 11/2001 | .............. G02B 7/02 |
| WO | WO2001081970 | A3 | 11/2001 | .............. G02B 7/02 |
| WO | WO2002017383 | A2 | 2/2002 | ............. H01L 21/68 |
| WO | WO2002017383 | A3 | 2/2002 | ............. H01L 21/68 |
| WO | WO2006046101 | A1 | 5/2006 | ............. G02B 7/182 |
| WO | 2007077371 | A1 | 7/2007 | |
| WO | 2015031148 | A1 | 3/2015 | |
| WO | 2015031151 | A1 | 3/2015 | |
| WO | 2015031594 | A2 | 3/2015 | |
| WO | 2015054112 | A1 | 4/2015 | |

OTHER PUBLICATIONS

International Search Report and Written Opinion PCT/US2013/045325 dated Jul. 16, 2013, 6 Pgs.

* cited by examiner

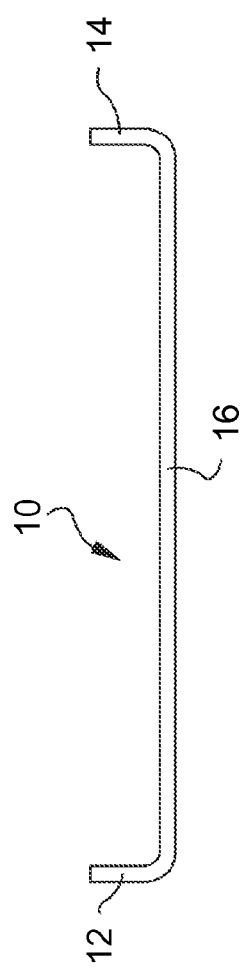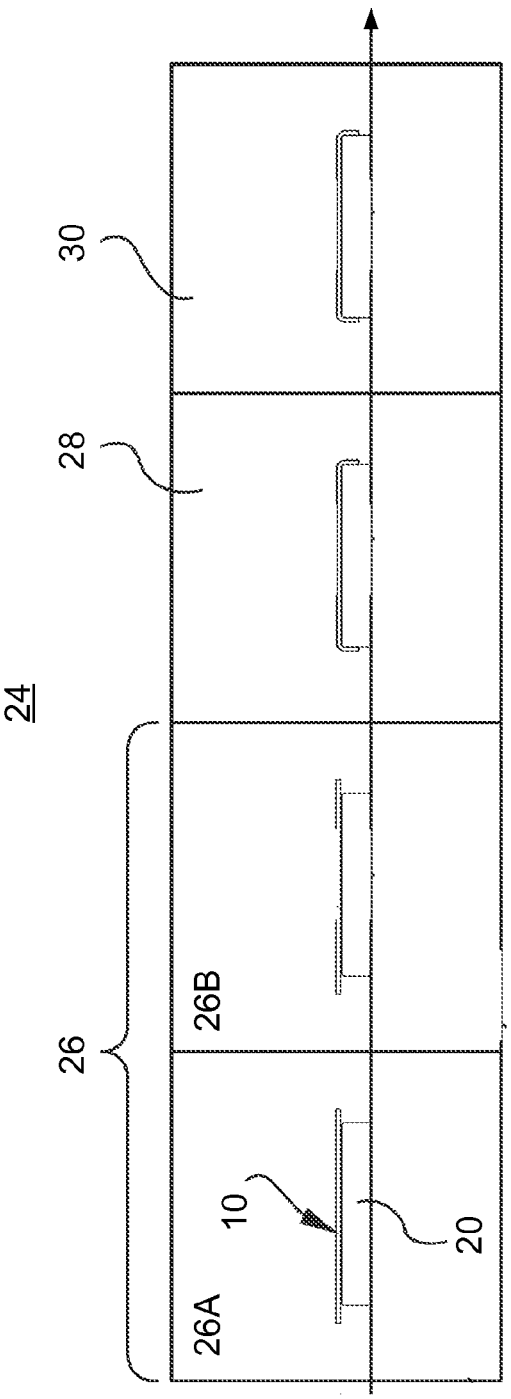

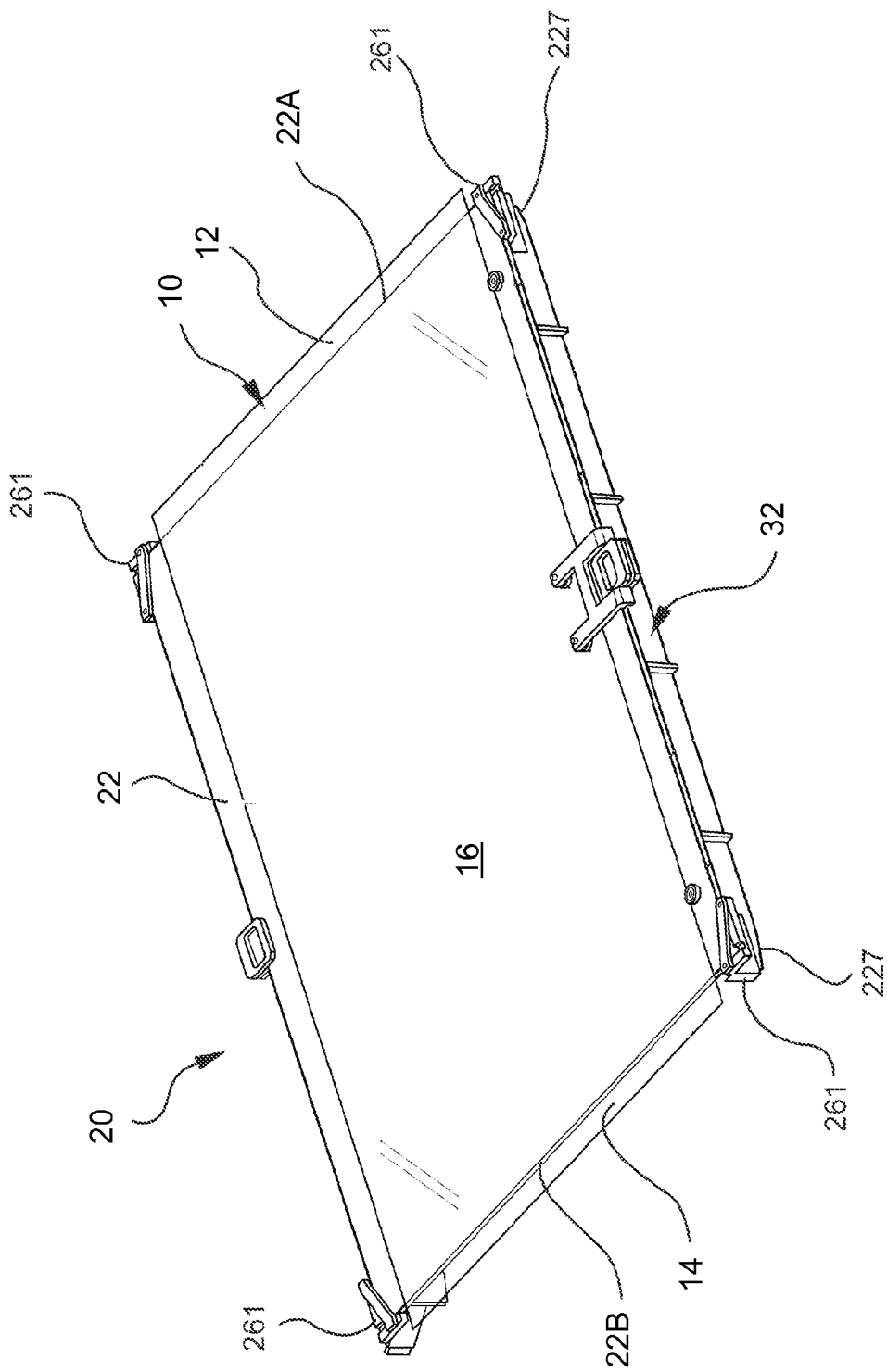

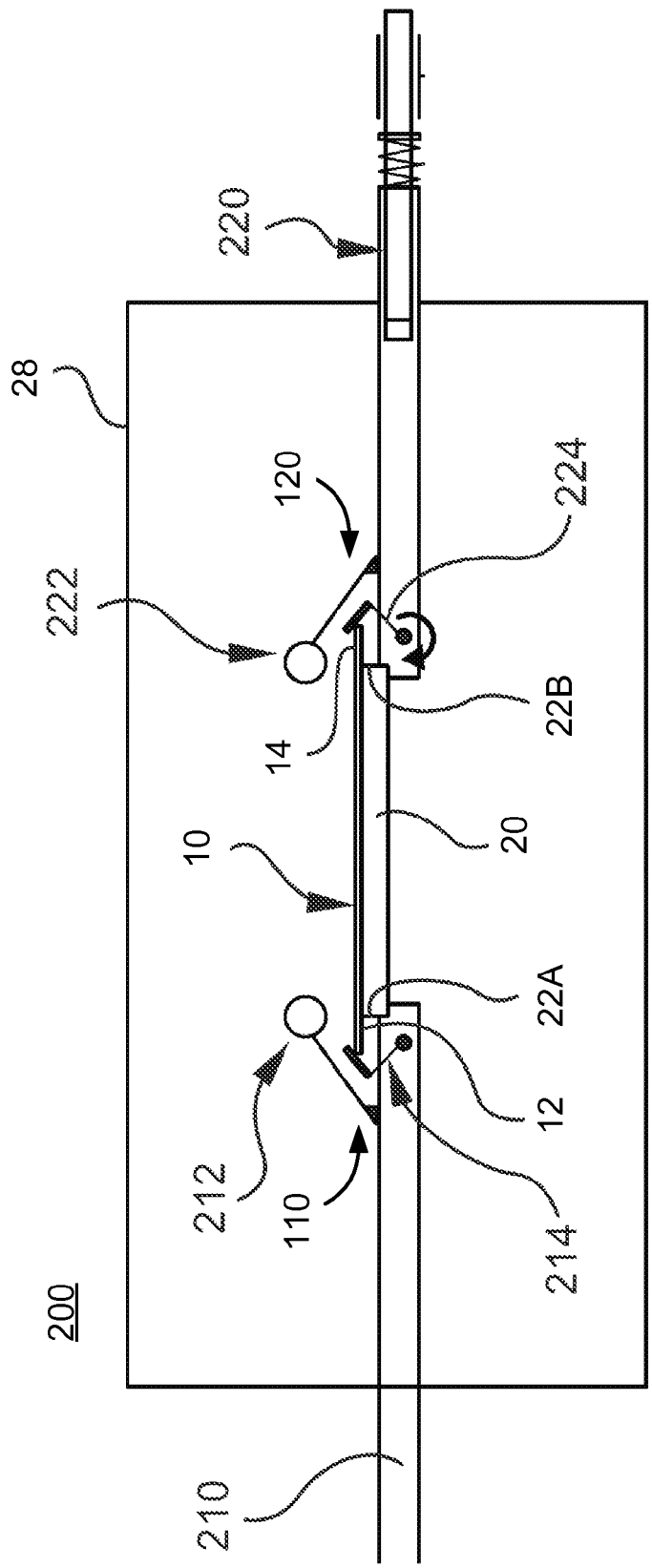

PROCESS AND SYSTEM TUNING PRECISION GLASS SHEET BENDING

This application claims the benefit of priority under 35 U.S.C. § 371 of International Application Number PCT/US13/45325 filed Jun. 12, 2013 which claims the benefit of priority under 35 U.S.C. § 119 of European Patent Application Serial No. 12290212.5 filed on Jun. 28, 2012 the content of which is relied upon and incorporated herein by reference in its entirety.

BACKGROUND

The present disclosure is directed to methods and apparatus for localized heating of glass, such as for deformation of glass sheets during a manufacturing process. For example, the disclosure includes details relating to supporting and accurately positioning a large area glass sheet for high precision bending thereof.

Glass components produced via reforming of initial material parts, such as glass sheets, have many applications, a significant one being glazing for the automotive industry. Reformed glass sheets are also used in display applications, for example in producing liquid crystal displays (LCDs), electrophoretic displays (EPD), organic light emitting diode displays (OLEDs), plasma display panels (PDPs), or the like. For example, electronic devices often include a protective cover glass that provides impact and scratch resistance to the front, display or touch control portion of the device.

Prior to reforming, glass sheets are commonly fabricated by flowing molten glass to a forming body whereby a glass ribbon may be formed by a variety of ribbon forming process techniques, for example, slot draw, float, down-draw, fusion down-draw, or up-draw. The glass ribbon may then be subsequently divided to provide sheet glass suitable for further processing into intermediate shapes for final products. There has been a growing interest in extremely high quality, thin glass sheets that are reformed into more complex three dimensional shapes, such as a combination of flat portions and highly curved edges.

The common processes used to reform glass sheets often involve a heating step at temperatures where deformation occurs under gravity or under mechanical actuation. Heating of a glass sheet using conventional techniques involves application of heat to the entire glass sheet. For example, known means for achieving heating of a glass sheet for reforming include the use of metal-based wires wound around a ceramic support. However, such techniques have not heretofore been satisfactory because heating of the entire glass sheet is not necessarily a desirable result, especially in a reforming operation where only local deformations are needed (e.g., at the edges) and heating of other portions of the glass sheet could result in damage and/or degradation of physical, optical and/or electrical characteristics.

Advancements in reforming processes have been made in order to provide techniques to heat a specific, localized area of a glass sheet in order to achieve formability at the specific location. While such advancements have been substantial, there are still improvements that need to be made. Specifically, very tight tolerances are required in high temperature, glass reforming processes. Even for large consumer electronic devices, such as appliance or LCD devices, there are needs for significantly tight tolerances at 600° to 700° C. local heating temperatures. In many areas of application, tolerances may be on the order of +/−0.2 mm to +/−0.5 mm, depending on the overall dimensions of the glass sheet, which may include a major dimension on the order of about 1.8 meters or more. Such tight tolerances are required for acceptable fit and finish when assembled with other parts of an overall product.

At such high temperatures, however, management of tight tolerances is difficult to achieve, and requires very accurate tuning devices that are capable of operating in a reliable and consistent manner over time. For example, meeting the tolerances requires very precise and repeatable positioning of the local heating elements and/or any bending force elements with respect to the glass sheet. Without such accuracy, it would be very difficult or impossible to achieve repeatable dimensions in the final product, especially in mass production.

Thus, there are needs for methods and apparatus for accurate and precise positioning of any localized heating elements and/or bending force elements in a glass reforming system in order to retain a high level of flatness in desired areas of the glass sheet; retaining pristine aspects of the glass sheet; obtaining a desired amount of deformation in certain areas of interest; and maintaining a high level of dimensional control.

SUMMARY

In one or more broad aspects, methods and apparatus provide for modification of a work-piece at elevated temperatures. For example, a carrier may be provided and operable to support the work-piece. A support mechanism may be provided that is movable via gross translation between: (i) a retracted position such that a distal end thereof is away from the carrier, and (ii) an extended position such that the distal end thereof is at least proximate to the carrier. A work-piece modification system may be coupled to, and disposed proximate to, the distal end of the support mechanism, and operating to facilitate modifying the work-piece at an elevated temperature. The work-piece modification system is at least proximate to the work-piece when the support mechanism is in the extended position. A precision tuning mechanism may couple the work-piece modification system to the support mechanism, and may operate to provide fine adjustments to an orientation, and a distance, of the work-piece modification system relative to the work-piece. The carrier may operate to support the work-piece within a furnace having an ambient temperature at least above 300° C., preferably at least above 500° C., and more preferably at least above 600° C. The fine adjustments of the precision tuning mechanism are preferably made via a plurality of controls outside the furnace at an ambient temperature substantially lower than that of the furnace.

Methods and apparatus provide for precisely bending at least one edge portion of a glass sheet via: a carrier operable to support the glass sheet such that an edge of the glass sheet overhangs an edge of the carrier; and a support mechanism being movable via gross translation between a retracted position and an extended position to move a bending system proximate the edge of the glass sheet to facilitate bending the edge of the glass sheet about the edge of the carrier. A precision tuning mechanism operates to provide fine adjustments to an orientation, a distance, a position, etc., of the bending system relative to the glass sheet. The carrier and glass sheet are located within a furnace at elevated temperature, while a plurality of controls for manipulating the precision tuning mechanism are located outside the furnace at a lower temperature.

In one or more further embodiments, methods and apparatus provide for precisely bending a glass sheet. In this regard, a carrier may be provided to support the glass sheet in a planar orientation, such that an edge of the glass sheet overhangs a corresponding edge of the carrier. A support mechanism may be provided for being movable via gross translation between: (i) a retracted position such that a distal end thereof is away from the edge of the carrier, and (ii) an extended position such that the distal end thereof is at least proximate to the edge of the carrier. A bending system may be coupled to, and disposed proximate to, the distal end of the support mechanism, and operating to facilitate bending the edge of the glass sheet about the edge of the carrier such that the bending system is at least proximate to the edge of the glass sheet when the support mechanism is in the extended position. A precision tuning mechanism may be provided for coupling the bending system to the support mechanism, and operating to provide fine adjustments to an orientation, and a distance, of the bending system relative to the glass sheet. The carrier may operate to support the glass sheet within a furnace having an ambient temperature at least at an annealing temperature of the glass sheet. The fine adjustments of the precision tuning mechanism may be made via a plurality of controls outside the furnace at an ambient temperature substantially lower than that of the furnace.

Directional terms such as "top", "upward", "bottom", "downward", "rearward", "forward", etc. may be used herein; however, they are for convenience of description and should not be interpreted as requiring a certain orientation of any item unless otherwise noted.

The term "relatively large" or "large" as used in this description and the appended claims in relation to a glass sheet means a glass sheet having a dimension of 1 meter or more in at least one direction.

The term "relatively high CTE" or "high CTE" as used in this description and the appended claims in relation to a glass sheet means a glass or glass sheet having a CTE of at least $70 \times 10^{-7}$ $C^1$.

The term "relatively thin" or "thin" as used in this description and the appended claims in relation to a glass sheet means a glass sheet having a thickness in a range of from about 0.5 mm to about 1.5 mm.

It is to be understood that both the foregoing general description and the following detailed description are merely exemplary, and are intended to provide an overview or framework to understand the nature and character of the claims.

Other aspects, features, and advantages of one or more embodiments disclosed and/or described herein will be apparent to one skilled in the art from the description herein taken in conjunction with the accompanying drawings.

BRIEF DESCRIPTION OF THE DRAWING

For the purposes of illustration, there are forms shown in the drawings that are presently preferred, it being understood, however, that the embodiments disclosed and/or described herein are not limited to the precise arrangements and instrumentalities shown.

FIG. 1 is a schematic edge view of a reformed glass sheet in accordance with one or more embodiments herein;

FIG. 2 is a schematic side view of a conveyor and bending oven according to one or more embodiments herein;

FIG. 3 is a perspective top view of a carrier for supporting the glass sheet according to one or more embodiments herein;

FIG. 4 is a schematic side view of the carrier, a support mechanism, and a bending system in a bending zone of the bending oven of FIG. 3;

DETAILED DESCRIPTION

Figure 5:
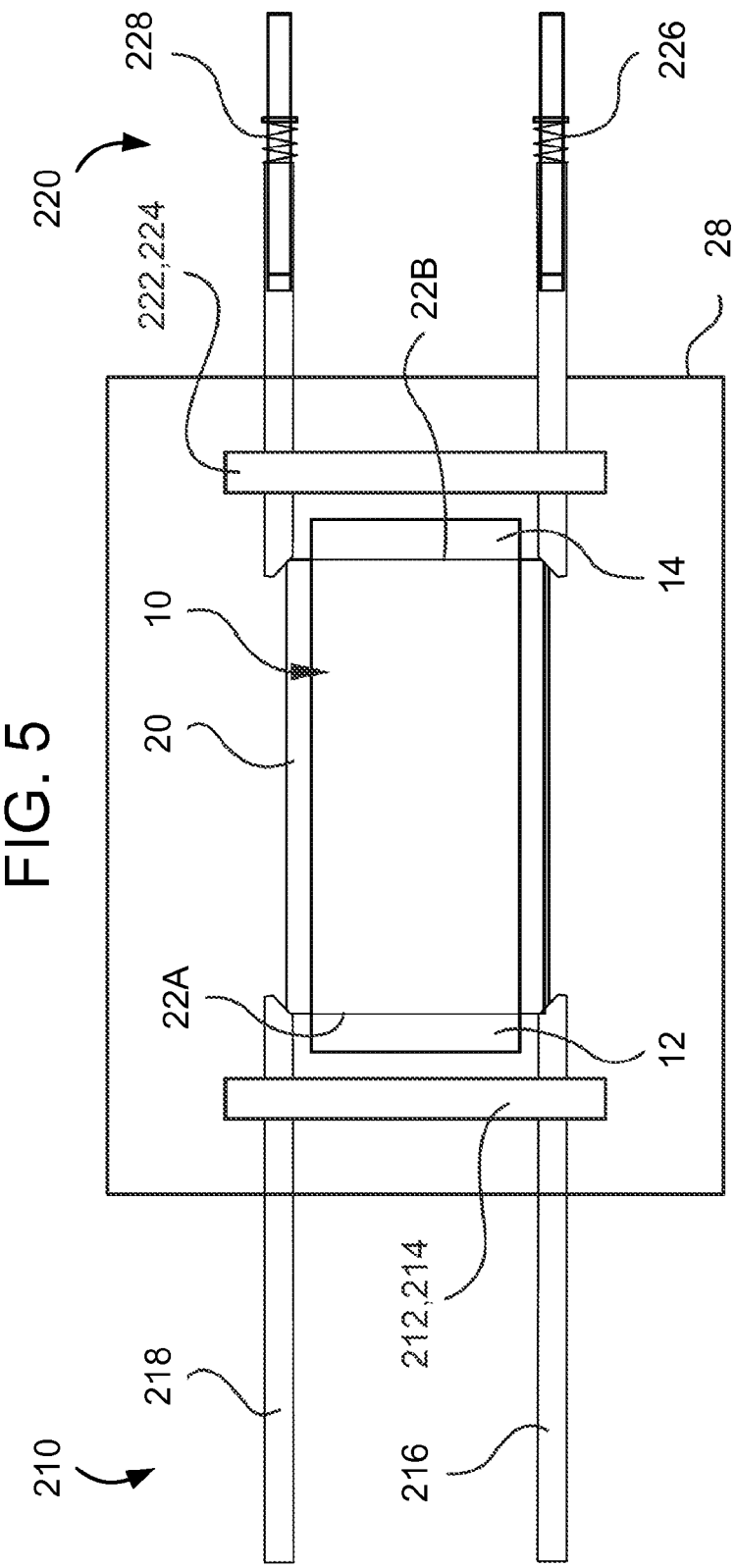
FIG. 5 is a schematic top view of the carrier, the support mechanism, and the bending system in the bending zone of the bending oven of FIG. 2.

With reference to the drawings wherein like numerals indicate like elements there is shown in FIG. 1 a schematic illustration of an embodiment of a reformed glass sheet 10 that may be used as a glass cover or fascia for an electronic device or architectural component. Such a glass sheet 10 may be reformed such that it has extending side portions 12, 14 and a generally planar central portion 16.

Glass covers for devices with electronic displays or touch controls are increasingly being formed of thin glass that has been chemically strengthened using an ion exchange process, such as Gorilla® glass from Corning Incorporated. Such glass is thin and lightweight and provides a glass cover with enhanced fracture and scratch resistance, as well as enhanced optical and touch performance. The glass sheet 10 may have a thickness from about 0.5 mm to about 1.5 mm, although other thicknesses are also possible.

Assembly tolerances on the order of +/−0.5 mm or less are often required to provide the desired quality look, feel, fit and finish for an electronic or other device. Such tolerances are difficult to achieve when performing high temperature, localized, high precision bending of relatively large glass sheets 10 (e.g., having a major dimension of about 1 meter or more) of any kind, but particularly for ion exchangeable glasses. Indeed, ion exchangeable glasses typically have a relatively high CTE and when heating a relatively large glass sheet 10 to a temperature sufficient to soften the glass to the point that forming is possible (e.g., about 600° to 700° C.), a number of factors must be addressed in order to maintain high precision tolerances, such as glass expansion, tooling precision and accuracy, etc.

One or more embodiments disclosed and/or described herein provide solutions for precision shaping of glass sheets 10 or any size using one or more bending processes, such as a reforming process employing localized, high temperature heating elements and/or localized pushing elements. Prior to discussing details concerning the methods and apparatus envisioned to improve the accuracy and precision of the reforming process, an overview of the overall reforming process will be provided.

In order to locally reform a glass sheet 10 into a desired shape, the glass sheet 10 is typically supported on a carrier (e.g., a frame or mold). The glass sheet 10 and the carrier are then placed in a bending furnace and the furnace is heated to a temperature between the annealing temperature and the softening temperature of the glass sheet 10. The glass sheet 10 may then be permitted to sag under the influence of gravity in order to form to the shape of the underlying carrier, especially any molding elements of the carrier.

Additionally, or alternatively, a force may be applied to one or more portions of the glass sheet 10 (e.g., by way of a pushing element, roller, etc.) to aid in the formation. The glass sheet 10 is then cooled and removed from the furnace.

As schematically illustrated in FIG. 2, in order to form a plurality of glass sheets 10 in a continuous fashion, a plurality of carriers 20 may be located on a continuously moving conveyor 21 for conveying the glass sheets 10 through a multi-zone bending furnace 24 in a serial fashion. The glass sheets are disposed onto the carriers 20 at a relatively cool ambient environment (e.g., room temperature) upstream from the furnace 24. A first of the zones may be a preheating zone 26, in which the glass sheets 10 are heated to a temperature close to their annealing temperature. The overall preheating zone 26 may include a plurality of pre-heating zones 26a, 26b, etc., each at an increasing temperature for sequentially increasing the temperature of the glass sheets 10 as they are conveyed through the zones.

The next zone is a bending zone 28, where the glass sheets 10 are elevated to a processing or bending temperature, such as a temperature between the annealing temperature and the softening temperature, for example, a temperature approaching about 600° C.-700° C. The bending zone 28 provides the glass sheets 10 with an environment suitable to mold to the shape of the underlying carriers 20, especially a mold feature of the carriers 20. This may involve heating the entire bending zone 28 to the temperature of between about 600° C.-700° C. or it may involve providing a lower ambient temperature within the bending zone 28 and employing one or more local heating elements (not shown) to elevate particular areas of the glass sheets 10 (e.g., certain edges) to the higher temperature. Within the bending zone 28, the glass sheets 10 may be permitted to bend under gravity and/or they may receive mechanical force to urge the glass sheets 10 into conformity with the underlying mold feature of the carriers 20.

The glass sheets 10 are cooled in a cooling zone 30 to the external ambient temperature and then removed from the furnace 24.

FIG. 3 illustrates a flat, planar glass sheet 10 on a carrier 20 for symmetrically bending opposing side edge portions 12, 14 of the glass sheet 10, while a central portion 16 of the glass sheet 10 remains flat. The carrier 20 is designed for accurately registering/locating the glass sheet 10 thereon and retaining the glass sheet 10 in position throughout the reforming process. The carrier 20 may include a mold or stage mounted on a base or frame 32 made of a material having stable thermal and mechanical properties at bending/processing temperatures, for example refractory steel type ASI 310. The glass sheet 10 is precisely placed (registered) on the stage 22, with the side edge portions 12, 14 of the glass sheet 10 extending a desired distance beyond opposing edges 22A, 22B of the stage 22.

The stage 22 has a precisely formed or machined rigid, substantially non-deformable, inelastic, flat, planar top surface for supporting the central portion 16 of the glass sheet throughout the reforming process. However, it will be appreciated that the stage 22 may alternatively be curved or bowed to impart a non-flat shape to the central portion 16 of the glass sheet 10 or the side portions of the glass sheet 10 if desired. As such, the term "substantially planar" as used herein and in the appended claims is intended to mean planar, as well as slightly curved or bowed, for example a convex or concave curvature in one or more directions having a radius of up to 100 cm. The edges 22A, 22B of the stage 22 may be precisely machined to match the desired curvature or bend radius of the edge portions 12, 14 of the glass sheet 10. Similarly, the edge regions of the top surface of the stage 22 may also be contoured or inclined, e.g. with beveled or curving edge portions, for imparting a desired shape to the edge portions 12, 14 of the glass sheet 10.

The stage 22 may be formed of a rigid material having a low coefficient of thermal expansion (CTE) in order to provide a stable, non-deformable support surface for the glass sheet 10 in a precise, known geometrical reference throughout the process. For example, the stage may be formed of a material having a CTE of no more than about $10 \times 10^6$ K$^{-1}$, or no more than about $6 \times 10^{-6}$ K$^{-1}$. The stage 22 may also be made of various materials having a low thermal expansion that are essentially elastic in the 20° C. to 750° C. range, in order to avoid permanent deformations from developing in the stage 22. Such deformations may occur if materials such as stainless steel are used, due to the accumulation of thermal gradients upon repeated heating and cooling of the stage 22. For example, the stage 22 may be formed of a refractory non-metallic material, such as ceramic, glass-ceramic, silicon carbide (SiC) or other rigid, non-deformable materials. The stage 22 may be formed of an insulating material, in order to minimize thermal transfer between the glass sheet 10 and the stage 22. The stage 22 may also be formed with a thickness of no more than about 1 cm in order to further minimize the thermal inertia of the stage 22 and minimize the thermal impact of the stage 22 on the glass sheet 10 during reforming.

As previously described herein, the entire glass sheet 10 may be heated to a bending temperature between the annealing temperature and the softening temperature of the glass sheet 10 in the bending zone 28 in a single heat zone process. Alternatively, the pre-heating zones 26 and the bending zone 28 may be maintained at temperatures that heat the glass sheet 10 in the bending zone 28 to a temperature that is near, but below, the bending temperature, e.g. close to the annealing temperature of the glass sheet 10. A localized heating device in the bending zone 28 may then heat only the edge portions 12, 14 of the glass sheet 10 up to the bending temperature. Alternatively, just portions of the glass sheet 10 over the edges 22A, 22B of the stage 22 may be heated to the bending temperature, with the outermost edge portions 12, 14 of the glass sheet 10 remaining below the bending temperature. Keeping the outermost edge portions 12, 14 of the glass sheet 10 below the bending temperature assures that these portions remain flat and planar and only the portions of the glass sheet 10 that are to be bent are heated sufficiently to bend.

The edge portions 12, 14 of the glass sheet 10 may be bent downward under the force of gravity alone. However, when bending a relatively thin glass sheet 10, relying on gravity alone to bend the edge portions 12, 14 may be unsatisfactorily slow and unreliable due to the light weight of the glass sheet 10. Thus, it may be advantageous to apply a force to the edge portions 12, 14 of relatively thin glass sheet 10 in order to increase the speed and reliability of the bending process.

When a bending mechanism is employed to apply localized heating and/or an external force to bend the glass sheet 10, then a locating or registration mechanism may need to be provided. Such will ensure accurate positioning of the bending mechanism relative to the edge portions 12, 14 of the glass sheet 10, so that such portions of the glass sheet 10 are bent with desired high precision tolerances. As will be discussed below, the bending mechanism may include localized heater(s) and/or bending force applying element(s). Such localized heaters and force applying devices must be precisely and accurately located at correct positions and orientations relative to the edge portions 12, 14 of the glass sheet 10, in order to raise the correct portions of the glass sheet to the bending temperature and to properly bend the edge portions 12, 14. Failure to heat the correct portions of the glass sheet 10 to the bending temperature and/or facilitate bending via force applying elements may result in failure of the glass sheet 10 and/or an otherwise unacceptable reformed sheet.

FIGS. 4 and 5 schematically illustrate an embodiment of a mechanism 200 for precisely bending the glass sheet 10. The mechanism 200 interacts with the carrier 20 on which the glass sheet 10 is supported. The mechanism 200 precisely locates at least one bending system, and preferably two bending systems 110, 120, relative to one of the edge portions 12, 14 of the glass sheet 10 in the bending zone 28 of the furnace 24. Each bending system 110, 120 may include one or more localized heating devices and/or one or more bending force applying elements (e.g., pushing devices, rollers, etc.). In the illustrated embodiment, there are two bending systems 110, 120 for locating respective heating devices and/or bending force elements relative to the edge portions 12, 14 of the glass sheet 10. The bending system 110 includes a localized heating device 212 and a bending force element 214, while the bending system 120 includes a localized heating device 214 and a bending force element 224.

At least one support mechanism, and preferably two support mechanisms 210, 220 operate to support and move respective ones of the bending systems 110, 120 relative to the carrier 20 and glass sheet 10. As shown, each of the bending systems 110, 120 is coupled to a distal end of respective one of the support mechanisms 210, 220. Each support mechanism 210, 220 operates to move via gross translation between: (i) a retracted position, such that the distal end thereof is away from the respective edge 22A or 22B of the carrier 20 and the glass sheet 10, and (ii) an extended position (as shown in FIG. 4) such that the distal end thereof is at least proximate to the respective edge 22A or 22B of the carrier 20 and the glass sheet 10. It is noted that FIG. 5 is a top view of the mechanism 200, where the support mechanisms 210, 220 are in an intermediate position between the retracted and extended positions. When the support mechanisms 210, 220 are in the extended positions, each bending system 110, 120 operates to facilitate bending the associated edge 12, 14 of the glass sheet 10 about the associated edge 22A, 22B of the carrier 20.

As best seen in FIG. 5, in the illustrated embodiment each support mechanism 210, 220 includes a pair of parallel members (or arms) 216, 218 and 226, 228 which extend from outside to inside the bending zone 28. The gross movement of the respective support mechanisms 210, 220 may be achieved using any suitable means, such as, for example, high precision stepper motors, hydraulic devices, pneumatic devices, etc. Preferably, the mechanisms for achieving the gross movement are located outside the bending zone 28 at a lower ambient temperature, such as room temperature. Each bending system 110, 120 is disposed at the distal ends of each pair of members 216, 218 and 226, 228.

The local heaters 212 and 222 may be any suitable local heating device, such as radiant heaters, and the bending force elements 214 and 224 may be any suitable mechanisms, such as mechanical pushers, air nozzles, etc. The heaters 212, 222 and bending force elements 214, 224 may be elongate devices that act on the entire length of each edge portion 12, 14 of the glass sheet 10.

In order to achieve desired precision and accuracy in heating and bending the edges 12, 14 of the glass sheet 10, the respective pairs of heaters 212, 214 and bending force elements 222, 224 should be maintained substantially parallel to the respective edges 22A, 22B of the stage 22 of the carrier 20 as the support mechanisms 210, 220 move between the retracted and extended positions. As will be discussed in detail below, a precision tuning mechanism may be employed to couple each bending system 110, 120 to the associated support mechanism 210, 220. Each precision tuning mechanism operates to provide fine adjustments to the orientation, distance, position, etc., of the associated bending system 110, 120 relative to the glass sheet and carrier 20 in order to achieve desired degrees of perpendicularity and positional accuracy during the reforming process.

Figure 6:
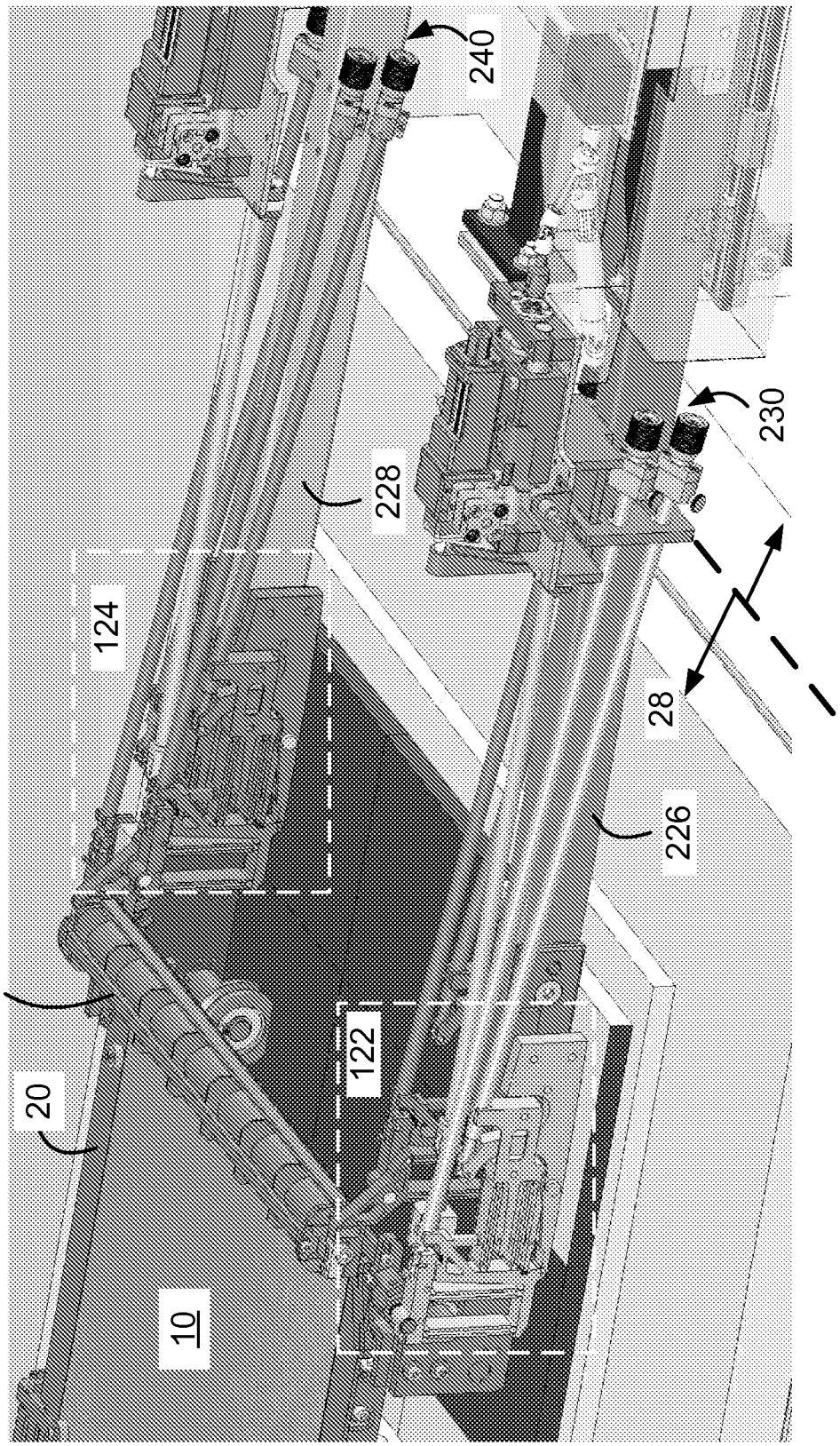
FIG. 6 is a perspective view of a support mechanism and bending system suitable for use in the system of FIGS. 4-5 and or other embodiments herein.

Reference is now made to FIG. 6, which is a more detailed view of one side of the mechanism 200, in particular, the side on which the support mechanism 220 (members 226, 228) and bending mechanism 120 (heating element 222 and bending force element 224) are located. At least one, and preferably a pair of precision tuning mechanisms 122, 124 is disposed at the distal end of the support mechanism 220, more particularly, one precision tuning mechanism 122 disposed at the distal end of one member 226, and the other precision tuning mechanism 124 disposed at the distal end of the other member 228. Each of the local heating element 222 and the bending force element 224 of the bending mechanism 120 is supported at each opposing end by a respective one of the precision tuning mechanisms 122, 124. A partial wall of the bending zone 28 is illustrated, which defines the inside of the bending zone 28 (indicated by the arrow towards the left of the drawing) and the outside of the bending zone 28 (indicated by the arrow towards the right of the drawing). Thus, the members 226, 228 of the support mechanism 220 extend out of the bending zone 28 and operate to move, via gross translation, between: (i) a retracted position such that the bending mechanism 120 is away from the edges of the carrier 20 and glass sheet 10, and (ii) an extended position (as shown) such that the bending mechanism 120 is at least proximate to the edges of the carrier 20 and glass sheet 10.

Figure 7:
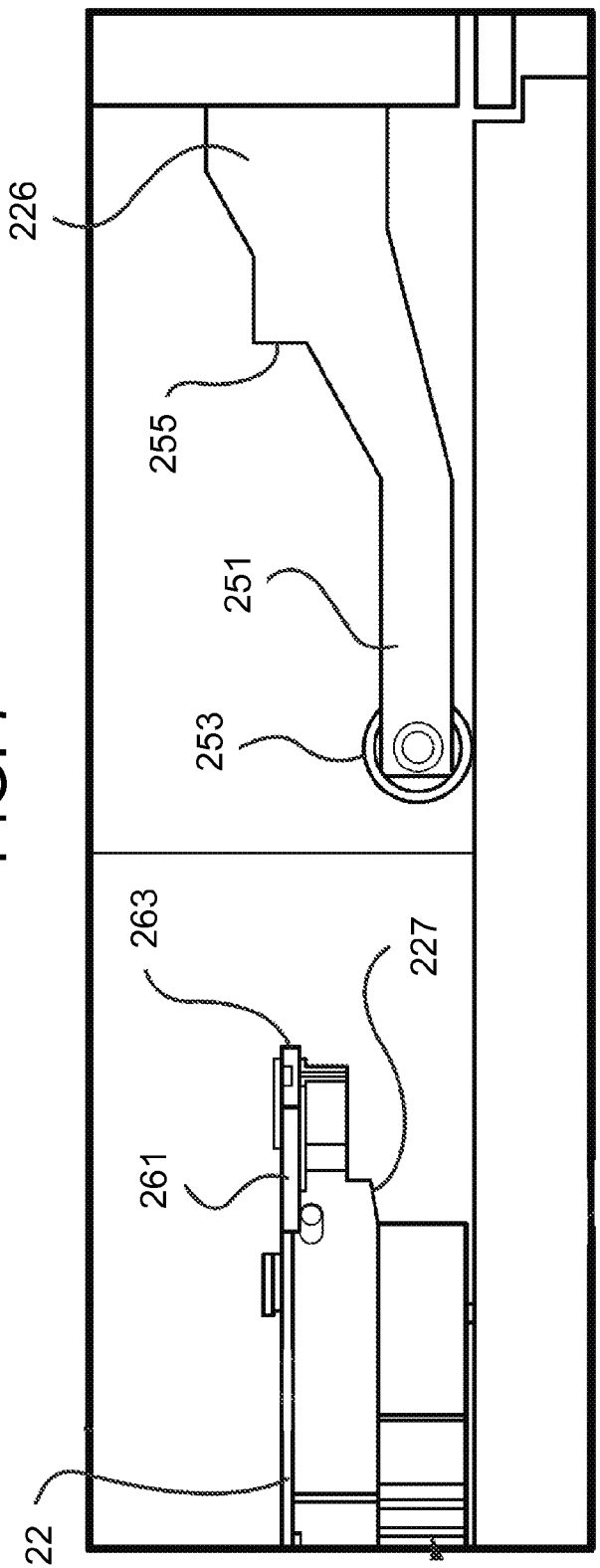
FIG. 7 is a side view of portions of the carrier and the support mechanism of FIGS. 3-6 in a retracted position.
Figure 8:
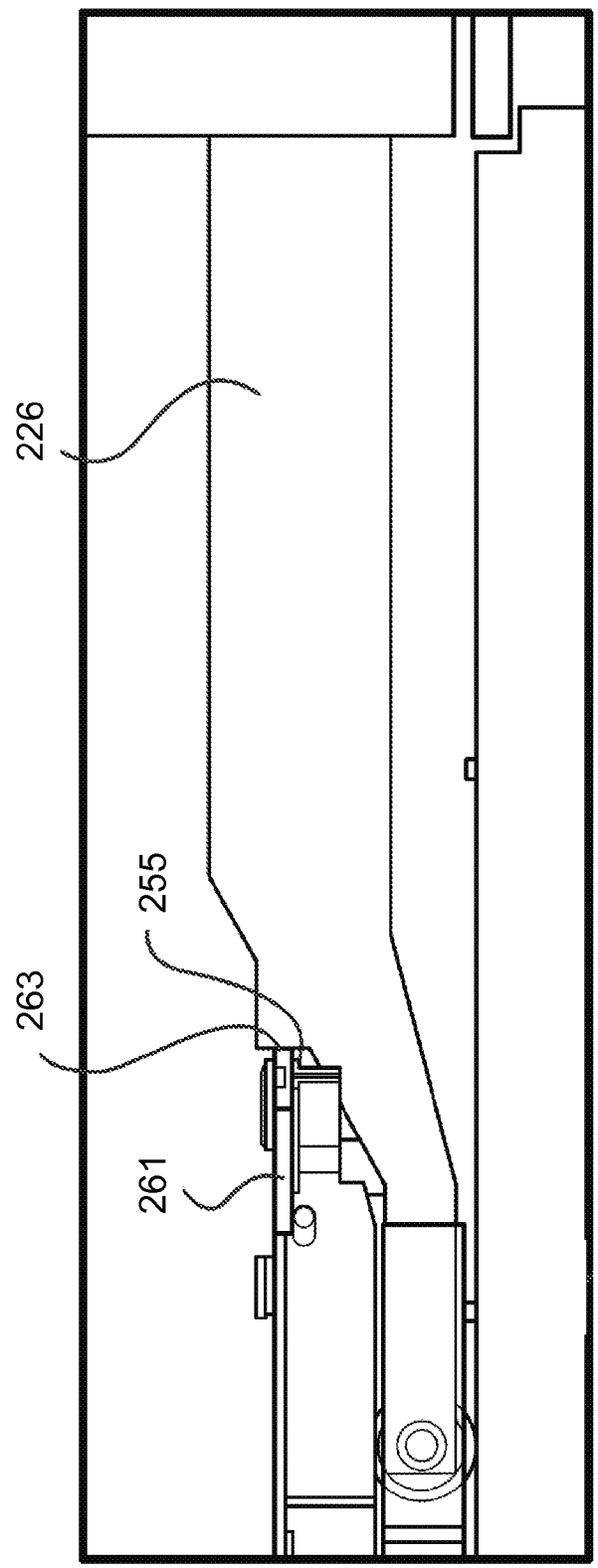
FIG. 8 is a side view of the carrier and the support mechanism of FIGS. 3-6 in an extended position.

Reference is now made to FIGS. 7 and 8, which illustrate the gross movement of the support mechanism 220 from the retracted position (FIG. 7) to the extended position (FIG. 8). For clarity, details of the bending mechanism 120 have been omitted from the drawing. Although only member (arm) 226 is viewable in the illustration, each of members 226, 228 (and also each of the members 216, 218 of the opposite support mechanism 210) includes a lift arm 251 and a lift roller 253 rotationally mounted on a distal end of the lift arm 251. A precision stop surface 255 is formed in, or provided on, each lift arm 251. A cap 261 and a precision formed reference surface 263 are disposed at respective sides of the edge 22B of the carrier 20 (and also at the opposite edge 22A of the carrier 20). In order to achieve the extended position, the arms 226, 228 (and opposing arms 216, 218) are moved toward the carrier 20 via the gross movement mechanism discussed above. As the arms 216, 218 and the arms 226, 228 move toward the extended position, each of the respective lift rollers 253 contacts a corresponding ramp 227 on the carrier 20 and lifts the carrier 20 upward (FIG. 8). Each lift roller 253 then contacts a respective portion of a lower surface of the carrier 20, thereby precisely lifting a respective corner of the carrier 20. As the arms 216, 218, 226, 228 continue to move toward the carrier 20, the respective stop surface 255 on each arm contacts a respective one of the reference surfaces 263. The arms 216, 218, 226, 228 are thus in the extended position and retain the carrier 20 securely clamped in position during the reforming process.

In theory, the above-described mechanisms and operation should result in the bending systems 110, 120 (and specifically the heating elements 212, 222 and the bending force elements 214, 224) being precisely positioned relative to the carrier 20 and the edges 12, 14 of the glass sheet 10 when the supporting mechanisms 210, 220 are in the extended positions. At that point, the heating elements 212, 222 may provide very precise localized heating to the edges 12, 14, which elevates the temperature of the glass sheet 10 sufficiently to bend such edges 12, 14. Additionally, the bending force elements 214, 224 may provide pressing force to the edges 12, 14 of the glass sheet 10 to precisely and accurately facilitate such bending. It has been discovered, however, that over time, temperature cycling, and/or set-up changes, the precision and/or accuracy of the reforming process may suffer. Indeed, slight variations in the orientation, position, distance, etc. of the elongate bending systems 110, 120 relative to the glass sheet 10 and carrier 20 may result, even with the registration elements discussed above.

As mentioned above, however, the precision tuning mechanisms 122, 124 that couple the bending system 120 to the arms 226, 228 of the associated support mechanism 220 may address some or all of such variations in the orientation and position of the bending system 120 relative to the glass sheet 10 and carrier 20. Again, although only one side of the carrier 20 is illustrated in FIG. 6, on the opposing side of the carrier 20 similar precision tuning mechanisms (not shown) may couple the bending system 110 to the associated support mechanism 210.

Each precision tuning mechanism 122, 124 operates to provide fine adjustments in the orientation, position, and/or distance, etc., of the bending system 120 relative to the glass sheet 10 and carrier 20 in order to achieve desired degrees of perpendicularity and positional accuracy during the reforming process. As best seen in FIG. 6, fine adjustments of each precision tuning mechanism 122, 124 are made via a respective plurality of controls 230, 240 outside the bending zone 28. Locating the controls 230, 240 at an ambient temperature substantially lower than that within the bending zone 28 of the furnace 24 permits an operator to make adjustments at any time, even when the bending zone 28 is at a very high ambient temperature.

Upon close inspection, each precision tuning mechanism 122, 124 may include one or more adjustment mechanisms. In the embodiment shown, the precision tuning mechanism 122 includes two distinct adjustment mechanisms (each with multi-directional control) and the precision tuning mechanism 124 includes two more adjustment mechanisms (again, each with multi-directional control). As will be discussed in more detail below, the number of adjusting mechanisms is related to the ability of each precision tuning mechanism 122, 124 to independently adjust the orientation, position, distance, etc. of each of the local heating element 222 and the bending force element 224. Each of the adjusting mechanisms will be discussed in detail below.

Figure 9:
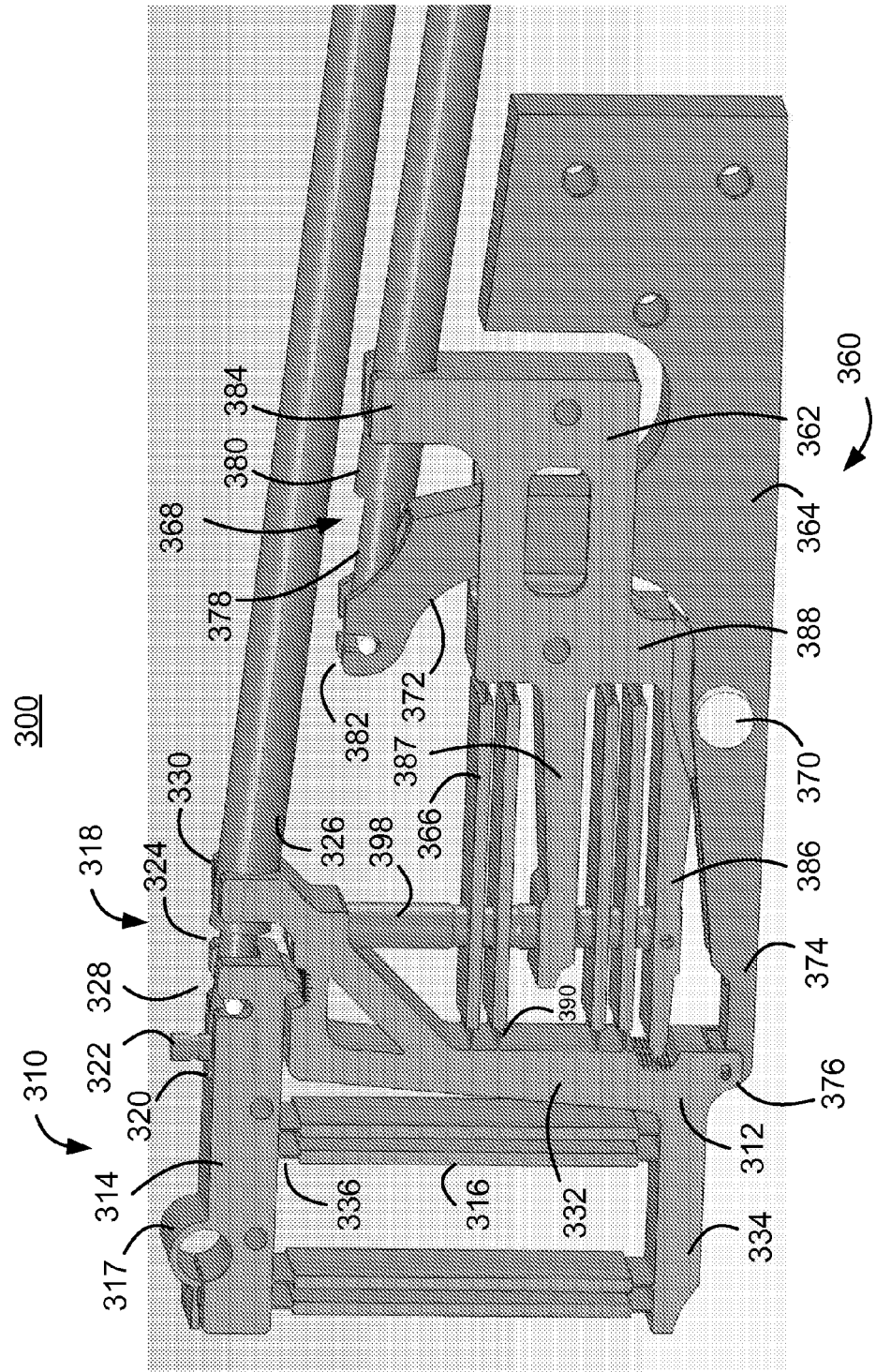
FIGS. 9, 10, and 11 are detailed views of a precision tuning mechanism suitable for use in the system of FIG. 6 and other embodiments herein.

Reference is now made to FIG. 9, which illustrates one adjustment mechanism 300 suitable for use in implementing the precision tuning mechanisms 122, 124. Two such adjustment mechanisms 300 would be used to implement each of the specific precision tuning mechanisms 122, 124 shown in FIG. 6, although skilled artisans will readily understand that any number of adjustment mechanisms 300 may be employed to achieve the desired degrees of freedom in adjusting the orientations, positions, distances, etc. of each end of the respective bending mechanisms 110, 120. The adjustment mechanism 300 includes at least one of an X-direction adjustment mechanism 310 and a Y-direction adjustment mechanism 360. As illustrated, the adjustment mechanism 300 includes both an X-direction adjustment mechanism 310 and a Y-direction adjustment mechanism 360.

The X-direction adjustment mechanism 310 operates to adjust a position of the associated bending system 110 or 120 relative to the glass sheet 10 in an X-direction, substantially parallel to the planar portion 16 of the glass sheet 10. The X-direction adjustment mechanism 310 includes a base 312, a translation block 314, one or more spacer plates 316, and an actuator 318. At least a portion of the associated bending system 110 or 120 is coupled to the translation block 314, which is movable in order to make fine adjustments to the orientation, position, distance, etc. of the bending system 110 or 120 relative to the glass sheet 10 and carrier 20. In the embodiment illustrated in FIG. 6, a first adjustment mechanism 300 operates on one end of the localized heating element 222, and a separate, second adjustment mechanism 300 operates on one end of the bending force element 224. Alternative embodiments may provide for a single adjustment mechanism 300 to operate on one end of both the localized heating element 222 and the bending force element 224, although such an embodiment would provide fewer degrees of freedom in adjusting the associated bending system 120 relative to the glass sheet 10 in the X-direction.

Turning again to the details of the adjustment mechanism 300 of FIG. 9, the translation block 314 includes a coupling element 317, which is particularly suited for connecting to one end of a rotatable bending force element 224. In alternative embodiments, the coupling element 317 may be adapted to connect to one end of the localized heating element 222.

The base 312 is coupled to the support mechanism 220 (not shown) such that the base 312 cannot move in the X-direction. As will be established in more detail below, in the particular embodiment illustrated, the coupling of the base 312 to the support mechanism 220 is achieved via common elements with the Y-direction adjustment mechanism 360. Suffice it to say for now that the base 312 cannot move in the X-direction relative to the support mechanism 220.

The translation block 314 is in sliding engagement with respect to the base 312 and operates to move in the X-direction (illustrated by the arrows labeled X) in response to a translational force in the X-direction provided by the actuator 318. In particular, the translation block 314 includes an elongate slot 320 near a proximal end thereof through which a pin 322 extends. As will be discussed in greater detail below, the spacer plates 316 support the translation block 314 as the movement in the X-direction occurs, where the pin 322 guides the translation block 314 via the elongate slot 320 and prevents any undesired torsional motion. The actuator 318 applies the translational force in the X-direction to the proximal end of the translation block 314 via a push rod 324 sliding within a tube 326. A distal end of the push rod 324 is connected to the proximal end of the translation block 314 via a hinge mechanism 328, which may be implemented via any suitable means, such as a slot and pin. The tube 326 extends from a fixed position 330 on the base 312 near the proximal end of the translation block 314 to a position outside the bending zone 28 of the furnace 24 (see FIG. 6). The push rod 324 slides within the tube 326 in response to one of the plurality of controls 230 outside bending zone 28. Thus, the distal end of the push rod 324 is coupled to, and provides the translational force to, the proximal end of the translation block 314 in response to an X-direction control 230 outside bending zone 28. Given that the controls 230 are formed from suitable precision mechanical elements (such as micrometric screws, etc.), very precise telescoping of the push rod 324 within the tube 326 may be achieved, which results in very precise positioning of the translation block 314 in the X-direction.

The base 312 includes first and second arms 332, 334 extending transversely with respect to one another (in a general L-shape). The first arm 332 extends transversely from the proximal end of the translation block 314 to the second arm 334. The second arm 334 is spaced apart from, and extends in a direction substantially parallel to, the translation block 314. A plurality of the spacer plates 316 are coupled between the translation block 314 and the second arm 334 of the base 312. Each spacer plate 316 includes a first end coupled to the translation block 314 and a second end coupled to the second arm 334. The first and second ends of each spacer plate 316 include a respective flexible web 336 connecting such ends to the translation block 314 and the second arm 334, respectively. The thickness of a main body of each spacer plate 316 and the relatively smaller thickness of the flexible web 336 permit the spacer plates 316 to deform, bend, flex, etc., such that the translation block 314 is permitted to slide in the X-direction in response to the translational force in the X-direction, while maintaining the translation block 314 in a substantially parallel orientation with respect to the second arm 334 of the base 312.

Figure 10:
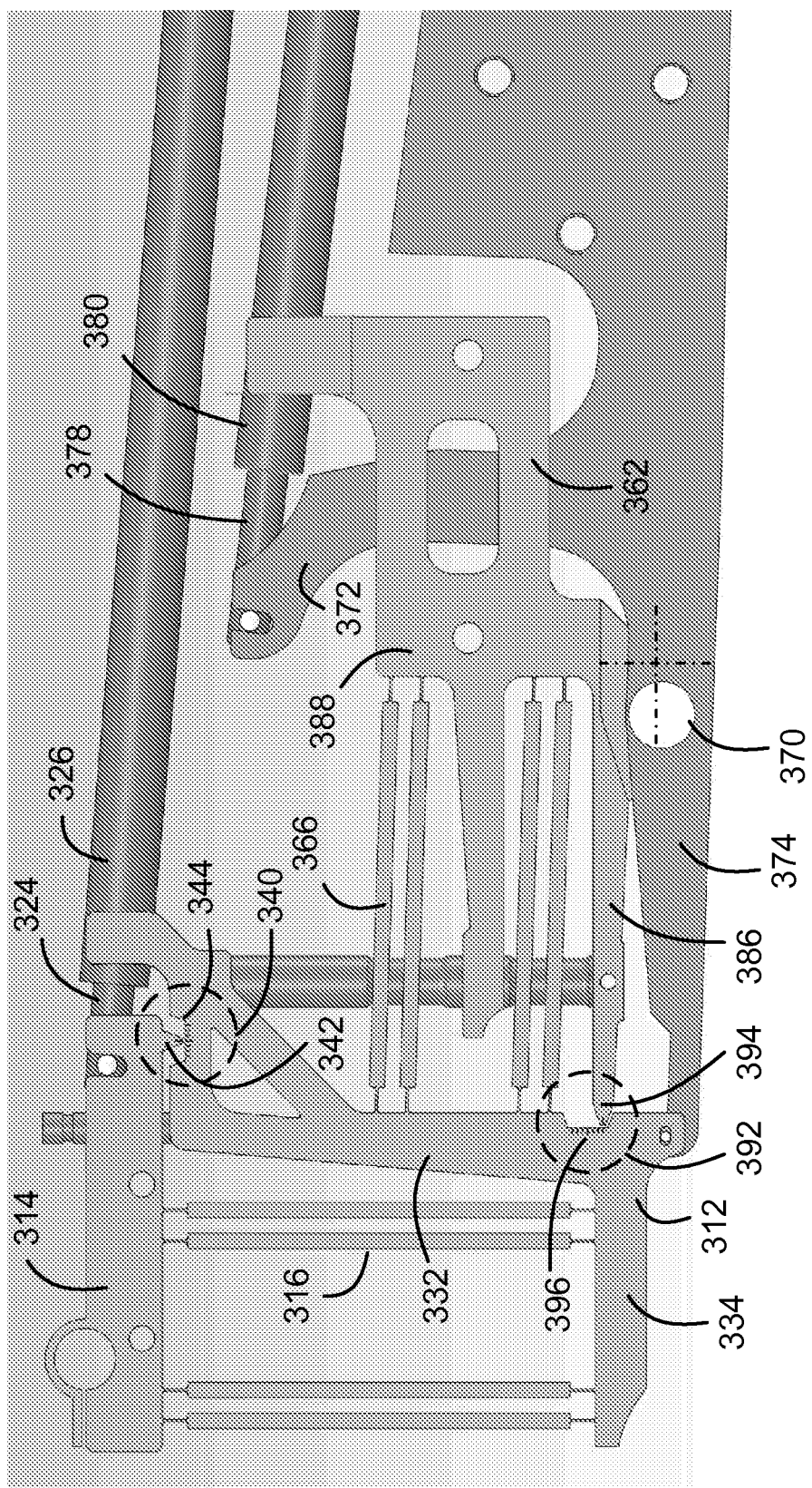
Figure 11:
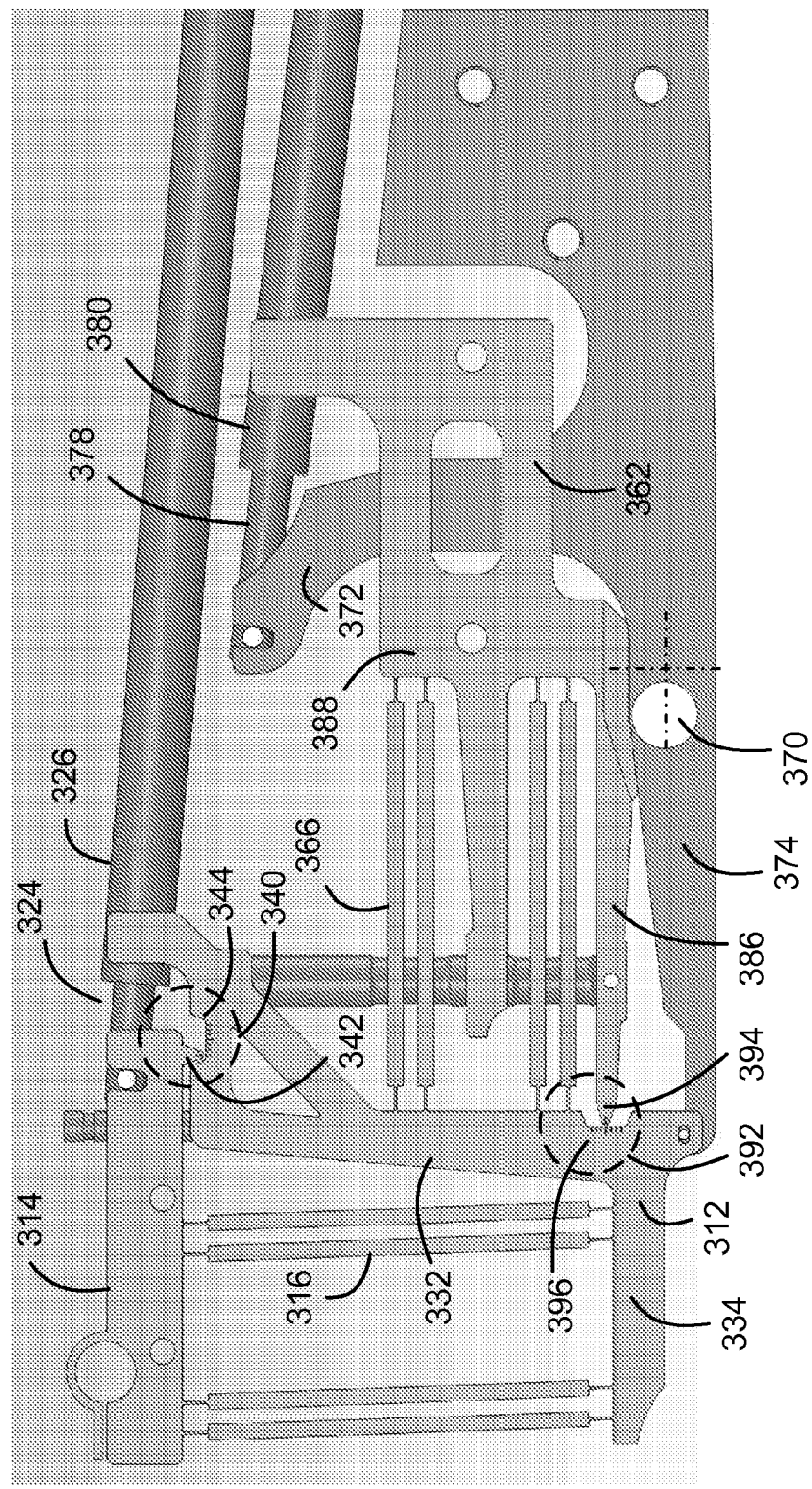

Additional details of the X-direction movement of the translation block 314 will be provided with reference to FIGS. 10 and 11. As illustrated in FIG. 10, the translation block 314 is in an essentially neutral or zero position (in the X-direction). From the neutral position, fine adjustments in the X-direction may be achieved via movement in a leftward (negative) direction or a rightward (positive) direction, as viewed into the page of the drawing. The definitions of the leftward movement as "negative" and the rightward movement as "positive" are based on a Cartesian Coordinate System with zero being located at the neutral position. It is noted, however, that any alternative naming convention may be employed and is well within the discretion of a skilled artisan.

In FIG. 11, the translation block 314 has moved in the leftward (negative) X-direction in response to a translational force provided by the push rod 324 sliding out of the tube 326 resulting from the actuation of one of the controls 230. As the translation block 314 moves in the leftward (negative) X-direction, each spacer plate 316 deforms, bends, flexes, etc., such that the translation block 314 is maintained in a substantially parallel orientation with respect to the second arm 334 of the base 312. Owing to the inherent properties of the material from which the spacer plates 316 are formed, they may provide a biasing force which urges the translation block 314 back to the neutral position (FIG. 10). The translation block 314 remains, however, in the X-direction position established by the push rod 324 within the tube 326.

Notably, the base 312, the translation block 314, and the spacer plates 316 are preferably all integrally formed of a single (preferably monolithic) piece of material in order to achieve a desirable level of precision in adjustment.

The X-direction adjustment mechanism 310 further includes an X-direction movement limiting feature 340, which permits the translation block 314 to move between respective positive and negative maxima from the neutral position. For example, the maximal position attained in the leftward (negative) X-direction shown in FIG. 11 may be considered a maximum X-direction position because the push rod 324 would have attained a maximum extension out of the tube 326. Although not illustrated, a maximal position attained in the rightward (positive) X-direction may be considered a minimum X-direction position because the push rod 324 would have attained a fully retracted position within the tube 326. Irrespective of the naming convention, the X-direction movement limiting feature 340 provides a limited range within which the translation block 314 may move in the X-direction. Although any number of implementations are possible, one such embodiment provides a protrusion 342 extending from one of the first arm 332 of the base 312 and the translation block 314, and a channel 344 extending within the other of the first arm 332 and the translation block 314. The protrusion 342 moves within the channel 344 in the X-direction and stops against respective opposing walls of the channel 344 at the respective maximum and minimum X-direction positions of the translation block 314. By way of example, the deviation in the X-direction in either direction from neutral may be about 4 mm.

Reference is again made to FIG. 9. The Y-direction adjustment mechanism 360 operates to adjust a position of the associated bending system 110 or 120 relative to the glass sheet in a Y-direction, substantially perpendicular to the planar portion 16 of the glass sheet 10. The Y-direction adjustment mechanism 360 includes a base 362, a lever 364, an intermediate member (in this embodiment the first arm 332 of the base 312), one or more spacer plates 366, and an actuator 368. Although the translation block 314 was discussed above as being a part of the X-direction adjustment mechanism 310, it may additionally or alternatively be considered a part of the Y-direction adjustment mechanism 360. Indeed, as will be established below, the Y-direction adjustment mechanism 360 operates to move the translation block 314 in the Y-direction (irrespective of whether the adjustment mechanism 300 includes an X-direction adjustment mechanism 310 or not). Thus, for the purposes of discussing the details of the Y-direction adjustment mechanism 360, one should keep in mind that the adjustment mechanism 300 may be implemented with either of, or both, the X-direction adjustment mechanism 310 and the Y-direction adjustment mechanism 360.

The base 362 is fixed to the support mechanism 220 (e.g., to the member 226, not shown in FIG. 9) such that no movement in any direction relative to the support mechanism 220 is permitted. Thus, the base 362 may be referred to as a "fixed base" 362. The lever 364 is rotationally coupled to the base 362 at a fulcrum 370, thereby defining an effort arm 372 and a load arm 374. Each of the effort arm 372 and the load arm 374 extends from the fulcrum 370 such that an effort force applied to a distal end of the effort arm 372 causes rotation of the lever 364 about the fulcrum 370 and translational movement of a distal end of the load arm 374 in the Y-direction.

The translation block 314 is coupled to the distal end of the load arm 374 of the lever 364 via the intermediate member (the first arm 332 of the base 312). In particular, a proximal end of the intermediate member (the first arm 332) is coupled to the distal end of the load arm 374 via a hinge 376 (or any alternative mechanism) such that the translational movement of the distal end of the load arm 374 in the Y-direction is communicated to the intermediate member (the first arm 332) and to the translation block 314. Thus, the translation block 314 moves in the Y-direction in response to the effort force applied to the distal end of the effort arm 372.

As will be discussed in more detail below, the effort force is applied to the distal end of the effort arm 372 via the actuator 368.

As noted above with respect to the X-direction adjustment mechanism 310 of this particular embodiment, the coupling of the base 312 to the support mechanism 220 is achieved via certain common elements with the Y-direction adjustment mechanism 360, such as the first arm 332 and the lever 364. Although the base 312 does not move in the X-direction relative to the support mechanism 220, the base 312 does move in the Y-direction relative to the support mechanism 220. Thus, while the base 362 may be referred to as a "fixed base", the base 312 may be referred to as a "moving base".

The actuator 368 applies the effort force to the distal end of the effort arm 372 via a push rod 378 sliding within a tube 380. A distal end of the push rod 378 is connected to the distal end of the effort arm 372 via a hinge mechanism 382, which may be implemented via any suitable means, such as a slot and pin. The tube 380 extends from a fixed position 384 on the base 362 near the distal end of the effort arm 372 to a position outside the bending zone 28 of the furnace 24. The push rod 378 slides within the tube 380 in response to one of the plurality of controls 230 outside bending zone 28. Thus, the distal end of the push rod 378 is coupled to, and provides the effort force to, the distal end of the effort arm 372 in response to a Y-direction control 230 outside bending zone 28. Again, the controls 230 are formed from suitable precision mechanical elements, and therefore very precise telescoping of the push rod 378 within the tube 380 may be achieved, which results in very precise positioning of the translation block 314 in the Y-direction.

The base 362 includes first and second arms 386, 388 extending transversely with respect to one another (in a general L-shape), each arm originating proximate to the fulcrum 370. The intermediate member (the first arm 332) extends between, and couples, the translation block 314 and the distal end of the load arm 374 (at the hinge 376), which is in a direction generally parallel and spaced apart from the second arm 388 of the base 362. A plurality of the spacer plates 366 are coupled between the second arm 388 of the base 362 and the intermediate member (the first arm 332). Each spacer plate 366 includes a first end coupled to the second arm 388 and a second end coupled to the intermediate member (the first arm 332). The first and second ends of each spacer plate 366 include a respective flexible web 390 connecting such ends to the second arm 388 and the intermediate member (the first arm 332), respectively. The thickness of a main body of each spacer plate 366 and the relatively smaller thickness of the flexible web 390 permit the spacer plates 366 to deform, bend, flex, etc., such that the intermediate member (the first arm 332) is permitted to move in the Y-direction in response to the effort force, while maintaining the intermediate member (the first arm 332) in a substantially parallel orientation with respect to the second arm 388 of the base 362.

Additional details of the Y-direction movement of the translation block 314 will be provided with reference to FIGS. 10 and 11. As illustrated in FIG. 11, the translation block 314 is in an essentially neutral or zero position (in the Y-direction). From the neutral position, fine adjustments in the Y-direction may be achieved via movement in a downward (negative) direction or an upward (positive) direction, as viewed into the page of the drawing. The definitions of the downward movement as "negative" and the upward movement as "positive" are based on a Cartesian Coordinate System with zero being located at the neutral position. It is noted, however, that any alternative naming convention may be employed and is well within the discretion of a skilled artisan.

In FIG. 10, the translation block 314 has moved in the upward (positive) Y-direction in response to an effort force provided by the push rod 378 sliding into the tube 380 resulting from the actuation of one of the controls 230. As the intermediate member (the first arm 332) moves in the upward (positive) Y-direction, each spacer plate 366 deforms, bends, flexes, etc., such that the intermediate member (the first arm 332) is maintained in a substantially parallel orientation with respect to the second arm 388 of the base 362 as the translation block 314 also moves in the Y-direction. Owing to the inherent properties of the material from which the spacer plates 366 are formed, they may provide a biasing force which urges the intermediate member (the first arm 332) back to the neutral position (FIG. 11). The intermediate member (the first arm 332) and the translation block 314 remain, however, in the Y-direction position established by the push rod 378 within the tube 380.

As was the case with the X-direction adjustment mechanism 310, the certain parts of the Y-direction adjustment mechanism 360, such as the fixed base 362, the intermediate member 332, the translation block 314, and the spacer plates 366 are preferably all integrally formed of a single (preferably monolithic) piece of material in order to achieve a desirable level of precision in adjustment. Further, when both the X-direction adjustment mechanism 310 and the Y-direction adjustment mechanism 360 are employed, at least the fixed base 362, the movable base 312, the translation block 314, and the spacer plates 316 and 366 are preferably all integrally formed of a single (preferably monolithic) piece of material.

The Y-direction adjustment mechanism 360 further includes a Y-direction movement limiting feature 392, which permits the translation block 314 to move between respective positive and negative maxima from the neutral position. For example, the maximal position attained in the upward (positive) Y-direction shown in FIG. 10 may be considered a maximum Y-direction position because the push rod 378 would have attained a maximum retraction into the tube 380. Although not illustrated, a maximal position attained in the downward (negative) Y-direction may be considered a minimum Y-direction position because the push rod 378 would have attained maximum extension out of the tube 380. Irrespective of the naming convention, the Y-direction movement limiting feature 392 provides a limited range within which the translation block 314 may move in the Y-direction. Although any number of implementations are possible, one such embodiment provides a protrusion 394 extending from one of the first arm 386 of the base 362 and the intermediate member (the first arm 332), and a channel 396 extending within the other of the first arm 386 and the intermediate member. The protrusion 394 moves within the channel 396 in the Y-direction and stops against respective opposing walls of the channel 396 at the respective maximum and minimum Y-direction positions of the translation block 314. By way of example, the deviation in the Y-direction in either direction from neutral may be about 4 mm.

With reference to FIG. 9, the Y-direction adjustment mechanism 360 may include some features to further assist in the precision and accuracy of the Y-direction adjustment. In particular, a pin 398 may be employed to facilitate in keeping the respective elements of the Y-direction adjustment mechanism 360 in proper orientation and operation, such as preventing unwanted torsional motion. One end of the pin 398 may be fixed to the first arm 386 of the base 362 and an opposite end of the pin 398 may be slidingly coupled to the distal end of the intermediate member (the first arm 332), preferably by way of an oversized aperture. Thus, as the intermediate member (the first arm 332) moves in the Y-direction, the pin 398 provides a loose guide but does not inhibit the movement. Each of the spacer plates 366 may include an aperture through which the pin 398 extends. As the spacer plates 366 flex, bend, move, etc. the apertures permit some relative movement with respect to the pin 398. Additionally or alternatively, the base 362 may include a third arm 387 extending transversely from the second arm 388 in a substantially parallel and spaced apart orientation with respect to the first arm 386. The third arm 387 may be connected to the pin 398 and provide additional stability to the system.

The respective spacer plates 316 and 366 are essentially shaped as right parallelepipeds and provide monolithic, locally flexible features, especially via the flexible webs 336, 390 to contribute to the X-direction and Y-direction precision movement. The torsional stiffness of the respective X-direction and/or Y-direction precision mechanisms 310, 360 may be increased by adding more spacer plates 316 and/or 366 or may be reduced by removing spacer plates 316 and/or 366.

Preferably all elements of the X-direction adjustment mechanism 310 and the Y-direction adjustment mechanism 360 are formed from suitable materials able to withstand the mechanical and thermal stresses associated with the operation discussed above. By way of example, many of the elements may be formed from special alloys, such as Inconel 718, which is a precipitation hardenable nickel-based alloy designed to display exceptionally high yield, tensile and creep-rupture properties at temperatures up to about 700° F. Other suitable Inconel grades may also be employed. An alternative material is ASI 310, although other materials may also be selected by the skilled artisan.

The system and structures described herein provide for reliable and precise bending of glass sheets 10, particularly relatively large and thin sheets of glass 10. With this construction the heaters and/or the force applying devices of the bending systems 110 and/or 120 may be precisely located relative to the carrier 20 and the glass sheet 10 with accuracies within tenths or even hundredths of a millimeter.

It is understood that the above-discussed embodiments of precision high temperature compatible tuning systems may be applied to other applications (beyond glass bending), which involve high temperature precision processes.

Although the embodiments herein have been described with reference to particular features and arrangements, it is to be understood that these details are merely illustrative of the principles and applications of such embodiments. It is therefore to be understood that numerous modifications may be made to the illustrative embodiments and that other arrangements may be devised without departing from the spirit and scope of the appended claims.

The invention claimed is:

1. An apparatus, comprising:
    a carrier operable to support a work-piece;
    a support mechanism being movable via translation between: (i) a retracted position such that a distal end thereof is away from the carrier, and (ii) an extended position such that the distal end thereof is at least proximate to the carrier;
    a work-piece modification system coupled to, and disposed proximate to, the distal end of the support mechanism, and operating to facilitate modifying the work-piece at an elevated temperature, where the work-piece modification system is at least proximate to the work-piece when the support mechanism is in the extended position; and
    a precision tuning mechanism coupling the work-piece modification system to the support mechanism, and operating to provide fine adjustments to an orientation, and a distance, of the work-piece modification system relative to the work-piece,
    wherein the carrier operates to support the work-piece within a furnace having an ambient temperature at least above 300° C., and
    further comprising a plurality of controls outside the furnace, arranged to control the fine adjustments of the precision tuning mechanism are made via.

2. An apparatus according to claim 1 for precisely bending a glass sheet as the work-piece, wherein:
    the carrier is operable to support the glass sheet in a planar orientation, such that an edge of the glass sheet overhangs a corresponding edge of the carrier;
    the work-piece modification system is a bending system coupled to, and disposed proximate to, the distal end of the support mechanism, and operating to facilitate bending the edge of the glass sheet about the edge of the carrier such that the bending system is at least proximate to the edge of the glass sheet when the support mechanism is in the extended position; and
    wherein the carrier is arranged to support the glass sheet within a furnace having an ambient temperature at least at an annealing temperature of the glass sheet.

3. The apparatus of claim 2, wherein the precision tuning mechanism includes:
    an X-direction adjustment mechanism operating to adjust a position of the bending system relative to the glass sheet in an X-direction, parallel to the glass sheet, wherein the X-direction adjustment mechanism includes:
    a base coupled to the support mechanism such that the base cannot move in the X-direction; and
    a translation block in sliding engagement with respect to the base and operating to move in the X-direction in response to translational force in the X-direction,
    wherein at least a portion of the bending system is mounted to the translation block.

4. The apparatus of claim 3, wherein the X-direction adjustment mechanism further includes:
    the base having first and second arms extending transversely with respect to one another, the first arm extending transversely from a proximal end of the translation block, and the second arm spaced apart from, and extending in a direction substantially parallel to, the translation block; and
    a plurality of spacer plates, each spacer plate having a first end coupled to the translation block and a second end coupled to the second arm of the base,
    wherein the first and second ends of each spacer plate includes a respective flexible web connecting such ends to the translation block and the second arm, respectively, and the spacer plates permit the translation block to slide in the X-direction in response to the translational force in the X-direction while maintaining the translation block in a parallel orientation with the second arm of the base,
    and optionally wherein the base, the translation block, and the spacer plates are all integrally formed of a single piece of material.

5. The apparatus of claim 4, wherein the X-direction adjustment mechanism further includes an X-direction movement limiting feature, comprising:
   a protrusion extending from one of the first arm of the base and the translation block; and
   a channel extending within the other of the first arm of the base and the translation block,
   wherein the protrusion moves within the channel in the X-direction and stops against respective opposing walls of the channel at respective maximum and minimum X-direction positions of the translation block.

6. The apparatus of claim 3 wherein the X-direction adjustment mechanism further includes:
   a tube extending from a position near the proximal end of the translation block to a position outside the furnace;
   a push rod sliding within the tube in response to an X-direction one of the plurality of controls outside the furnace,
   wherein a distal end of the push rod is coupled to, and provides the translational force to, the proximal end of the translation block in response to the X-direction control outside the furnace.

7. The apparatus of claim 2, wherein the precision tuning mechanism includes:
   a Y-direction adjustment mechanism operating to adjust a position of the bending system relative to the glass sheet in Y-directions, perpendicular to the glass sheet, wherein the Y-direction adjustment mechanism includes:
   a fixed base rigidly coupled to the support mechanism;
   a lever rotationally coupled to the fixed base at a fulcrum and including an effort arm and a load arm, each extending from the fulcrum such that an effort force applied to a distal end of the effort arm causes rotation of the lever about the fulcrum and translational movement of a distal end of the load arm in the Y-direction; and
   a translation block coupled to the distal end of the load arm of the lever and operating to move in the Y-direction in response to the effort force,
   wherein at least a portion of the bending system is mounted to the translation block.

8. The apparatus of claim 7, wherein the Y-direction adjustment mechanism further comprises:
   the fixed base having first and second arms extending transversely with respect to one another;
   an intermediate member extending from the translation block in a direction parallel and spaced apart from the second arm of the fixed base, and coupling the translation block to the distal end of the load arm; and
   a plurality of spacer plates, each spacer plate having a first end coupled to the second arm of the fixed base and a second end coupled to the intermediate member,
   wherein the first and second ends of each spacer plate includes a respective flexible web connecting such ends to the second arm of the fixed base and the intermediate member, respectively, and the spacer plates permit the intermediate member to slide in the Y-direction in response to the effort force while maintaining the intermediate member in a parallel orientation with the second arm of the fixed base;
   and optionally wherein the fixed base, the translation block, the intermediate member, and the spacer plates are all integrally formed of a single piece of material.

9. The apparatus of claim 8, wherein the Y-direction adjustment mechanism further includes an Y-direction movement limiting feature, comprising:
   a protrusion extending from one of the first arm of the fixed base and the intermediate member; and
   a channel extending within the other of the first arm of the fixed base and the intermediate member,
   wherein the protrusion moves within the channel in the Y-direction and stops against respective opposing walls of the channel at respective maximum and minimum Y-direction positions of the intermediate member.

10. The apparatus of claim 7, wherein the Y-direction adjustment mechanism further includes:
    a tube extending from a position proximate the distal end of the effort arm to a position outside the furnace;
    a push rod sliding within the tube in response to a Y-direction one of the plurality of controls outside the furnace,
    wherein a distal end of the push rod is coupled to, and provides the effort force to, the distal end of the effort arm of the lever in response to the Y-direction control.

11. The apparatus of claim 2, wherein the precision tuning mechanism includes an X and Y direction adjustment mechanism operating to adjust positions of the bending system relative to the glass sheet in an X-direction, parallel to the glass sheet, and a Y-direction, perpendicular to the glass sheet, wherein the X and Y direction adjustment mechanism includes:
    a fixed base rigidly coupled to the support mechanism;
    a lever rotationally coupled to the fixed base at a fulcrum and including an effort arm and a load arm, each extending from the fulcrum such that an effort force applied to a distal end of the effort arm causes rotation of the lever about the fulcrum and translational movement of a distal end of the load arm in the Y-direction;
    a moving base coupled to the distal end of the load arm such that the moving base: (i) moves in the Y-direction in response to the translational movement of the distal end of the load arm, and (ii) cannot move in the X-direction; and
    a translation block coupled to the moving base such that the translation block: (i) is in sliding engagement with the moving base in the X-direction and operates to move in the X-direction in response to a translational force in the X-direction, and (ii) is in fixed engagement with the moving base in the Y-direction and operates to move in the Y-direction along with the moving base in response to the translational movement of the distal end of the load arm,
    wherein the bending system is mounted to the translation block, and optionally wherein the X and Y direction adjustment mechanism further comprises:
    the fixed base having first and second arms extending transversely with respect to one another; and
    the moving base having third and fourth arms extending transversely with respect to one another, wherein:
    the third arm of the moving base is coupled: (i) at a distal end to, and extends transversely from, a proximal end of the translation block in a direction substantially parallel to, and spaced apart from, the second arm of the fixed base, and (ii) at a proximal end to the distal end of the load arm,
    the fourth arm of the moving base is spaced apart from, and extending in a direction substantially parallel to, the translation block;
    and further optionally wherein the X and Y direction adjustment mechanism further comprises an X and Y direction movement limiting feature, including:

a first protrusion extending from one of the third arm of the movable base and the proximal end of the translation block;

a first channel extending within the other of the third arm of the movable base and the translation block, wherein the first protrusion moves within the first channel in the X-direction and stops against respective opposing walls of the channel at respective maximum and minimum X-direction positions of the translation block;

a second protrusion extending from one of the first arm of the fixed base and a proximal end of the third arm of the movable base; and a second channel extending within the other of the first arm of the fixed base and the proximal end of the third arm of the movable base, wherein the second protrusion moves within the second channel in the Y-direction and stops against respective opposing walls of the channel at respective maximum and minimum Y-direction positions of the third arm of the movable base.

12. The apparatus of claim 11 wherein the X and Y direction adjustment mechanism further comprises:

a plurality of Y-direction spacer plates, each Y-direction spacer plate having a first end coupled to the second arm of the fixed base and a second end coupled to the third arm of the moving base, wherein the first and second ends of each of the Y-direction spacer plates includes a respective flexible web connecting such ends to the second arm of the fixed base and the third arm of the movable base, respectively, and the Y-direction spacer plates permit the third arm of the movable base to slide in the Y-direction in response to the translational movement of the distal end of the load arm in the Y-direction, while maintaining the third arm of the movable base in a parallel orientation with the second arm of the fixed base; and a plurality of X-direction spacer plates, each X-direction spacer plate having a first end coupled to the translation block and a second end coupled to the fourth arm of the moving base, wherein the first and second ends of each of the X-direction spacer plates includes a respective flexible web connecting such ends to the translation block and the fourth arm of the movable base, respectively, and the X-direction spacer plates permit the translation block to slide in the X-direction in response to the translational force in the X-direction while maintaining the translation block in a parallel orientation with the fourth arm of the movable base, and optionally wherein the fixed base, the moving base, the translation block, and the spacer plates are all integrally formed of a single piece of material.

13. The apparatus of claim 11, further comprising:

the support mechanism, including first and second lateral sides, each of the first and second lateral sides including a distal end located at the distal end of the support mechanism, such that the respective distal ends move between the retracted position and the extended position;

a first X and Y direction adjustment mechanism disposed proximate to the distal end of the first lateral side of the support mechanism;

a second X and Y direction adjustment mechanism disposed proximate to the distal end of the second lateral side of the support mechanism; and the bending system including at least one elongate body coupled at a first end to a first translation block of the first X and Y direction adjustment mechanism, and coupled at a second end to a second translation block of the second X and Y direction adjustment mechanism, such that the elongate body extends at least between the first and second lateral sides of the support mechanism, wherein the precision tuning mechanism operates to provide fine adjustments to an orientation, and a distance, of each opposing end of the elongate body of the bending system relative to the glass sheet via the plurality of controls outside the furnace and optionally, wherein the bending system includes at least one of:

(i) an elongate localized heating element defined at least in part by the at least one elongate body, and operating to elevate a temperature of the glass sheet in a region near the edge of the carrier to a level between the annealing temperature and a softening temperature of the glass sheet when the support mechanism is in the extended position and the bending system is proximate to the edge of the carrier and the edge of the glass sheet; and (ii) an elongate pushing member defined at least in part by the at least one elongate body, and operating to press against and facilitate bending the glass sheet over the edge of the carrier when the support mechanism is in the extended position proximate to the edge of the carrier.

14. The apparatus of claim 11, further comprising:

the support mechanism, including first and second lateral sides, each of the first and second lateral sides including a distal end located at the distal end of the support mechanism, such that the respective distal ends move between the retracted position and the extended position;

a first X and Y direction adjustment mechanism disposed proximate to the distal end of the first lateral side of the support mechanism;

a second X and Y direction adjustment mechanism disposed proximate to the distal end of the second lateral side of the support mechanism;

a third X and Y direction adjustment mechanism disposed proximate to the distal end of the first lateral side of the support mechanism;

a fourth X and Y direction adjustment mechanism disposed proximate to the distal end of the second lateral side of the support mechanism;

the bending system including at least first and second elongate bodies, where: (i) the first elongate body coupled at a first end to a first translation block of the first X and Y direction adjustment mechanism, and coupled at a second end to a second translation block of the second X and Y direction adjustment mechanism, such that the first elongate body extends at least between the first and second lateral sides of the support mechanism, and (ii) the second elongate body coupled at a first end to a third translation block of the third X and Y direction adjustment mechanism, and coupled at a second end to a fourth translation block of the fourth X and Y direction adjustment mechanism, such that the second elongate body extends at least between the first and second lateral sides of the support mechanism, wherein the precision tuning mechanism operates to provide fine adjustments to an orientation, and a distance, of each opposing end of the first elongate body, and each opposing end of the second elongate body, of the bending system relative to the glass sheet via the plurality of controls outside the furnace, and optionally wherein the bending system includes:

(i) an elongate localized heating element defined at least in part by the first elongate body, and operating to elevate a temperature of the glass sheet in a region near the edge of the carrier to a level between the annealing temperature and a softening temperature of the glass sheet when the support mechanism is in the extended position and the bending system is proximate to the edge of the carrier and the edge of the glass sheet; and (ii) an elongate pushing member defined at least in part by the second elongate body, and operating to press against and facilitate bending the glass sheet over the edge of the carrier when the support mechanism is in the extended position proximate to the edge of the carrier.

15. A method for precisely bending a glass sheet, comprising:

providing a carrier to support the glass sheet in a planar orientation, such that an edge of the glass sheet overhangs a corresponding edge of the carrier;

providing a support mechanism movable via gross translation between: (i) a retracted position such that a distal end thereof is away from the edge of the carrier, and (ii) an extended position such that the distal end thereof is at least proximate to the edge of the carrier;

providing a bending system coupled to, and disposed proximate to, the distal end of the support mechanism, and operating to facilitate bending the edge of the glass sheet about the edge of the carrier such that the bending system is at least proximate to the edge of the glass sheet when the support mechanism is in the extended position; and providing a precision tuning mechanism coupling the bending system to the support mechanism, and operating to provide fine adjustments to an orientation, and a distance, of the bending system relative to the glass sheet, wherein the carrier operates to support the glass sheet within a furnace having an ambient temperature at least at an annealing temperature of the glass sheet, and the fine adjustments of the precision tuning mechanism are made via a plurality of controls outside the furnace at an ambient temperature substantially lower than that of the furnace.

* * * * *

UNITED STATES PATENT AND TRADEMARK OFFICE
CERTIFICATE OF CORRECTION

PATENT NO. : 9,902,640 B2  
APPLICATION NO. : 14/409899  
DATED : February 27, 2018  
INVENTOR(S) : Thierry Luc Alain Dannoux et al.

Page 1 of 1

It is certified that error appears in the above-identified patent and that said Letters Patent is hereby corrected as shown below:

On the Title Page

Item (54), and in the Specification in Column 1, Line 1, Title, delete "SYSTEM TUNING" and insert -- SYSTEM FOR FINE TUNING --, therefor.

Signed and Sealed this
Thirty-first Day of December, 2019

Andrei Iancu
*Director of the United States Patent and Trademark Office*